_United States Patent Office_

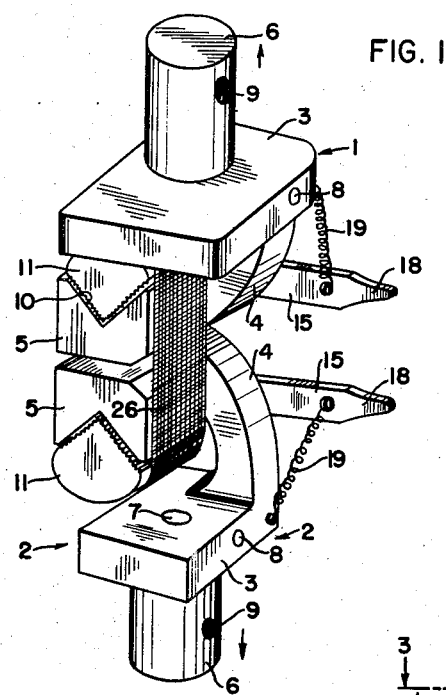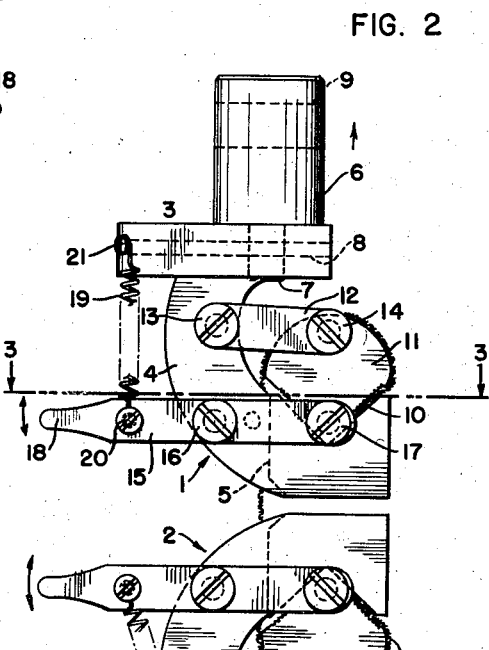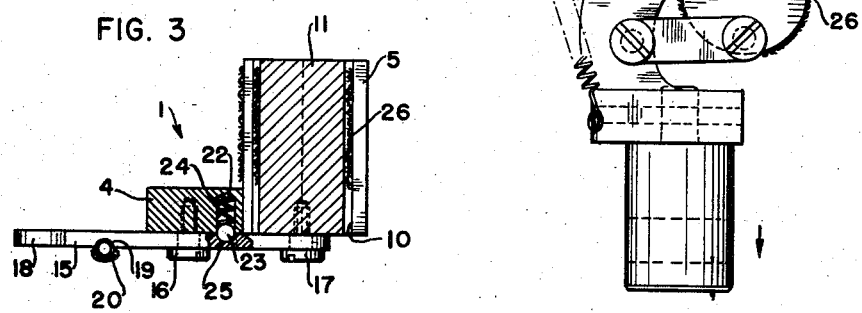

2,850,895
Patented Sept. 9, 1958

2,850,895

GRIPPING MEANS FOR FABRIC TEST SPECIMENS

Harry A. Mereness and Gaston G. Fornes, Charlottesville, Va., assignors to Institute of Textile Technology, Charlottesville, Va., a corporation of Virginia Application March 12, 1956, Serial No. 570,945

3 Claims. (Cl. 73—103)

This invention relates to testing apparatus for determining the tensile strength of fabrics and other flexible materials and more particularly to a novel test specimen gripping means for such apparatus.

There are presently used on tensile strength testing apparatus for fabric and other flexible materials a number of types of gripping means for holding the opposite ends of the fabric test specimen while tensile forces are applied thereto. The most common of these means is one which includes two pair of flat metal plates, pairs of these plates being attached to each of the tensile members of the testing apparatus. The ends of the specimen of fabric to be tested are inserted between the plates and then the plates are clamped together by suitable bolts or other compression means. In view of the high breaking strength, on the order of 1000 lbs. per in. of width of the test material, of many fabric materials, it is apparent that the plates must apply enormous pressures to the material to insure that it does not pull loose. The operator of the test apparatus must have considerable strength to be able to tighten the plate clamps so that the material will be firmly held. Moreover, the use of clamps of this type is quite time-consuming.

A frequent and direct consequence of the high pressures that must be applied to hold the test specimen between the plates are false breaks or ruptures of the test material near the bite of the plates due to the fabric being crushed and weakened. These imperfect breaks are not considered normal for obvious reasons and therefore cannot be included in the test data. Each false break requires that a new specimen be inserted in the apparatus and the test run again, all of which is time-consuming.

A further and insuperable difficulty with clamps of this type is that they are not capable of holding heavy and strong textile structures. Such materials will pull free of the plates before they rupture even though maximum clamping forces are applied.

It has been found that some fabrics having relatively low tensile strengths may be held by plate clamps if the gripping surfaces of the plates are lined with emery paper. However, under high stress the paper is stripped from the clamps and the specimen cannot be held even by this technique.

Some attempts have been made to design gripping means which are not subject to these objections. Among these is the apparatus shown in the United States patent to Scott, No. 2,327,139 issued August 17, 1943. Even this, however, is a complicated device dependent on screws to hold the clamps together. This makes the Scott apparatus time-consuming and difficult to use. And it will generally require a test specimen which is longer than that specified by the recognized test procedures.

We have invented a capstan type gripping means for holding test specimens of fabric and other flexible materials in tensile testing apparatus. Our new gripping means is simple to construct and is easy to use inasmuch as no threaded members are relied on to hold the test specimen in place. Moreover, our apparatus does not depend entirely on compressional forces to hold the test specimen and therefore it causes few if any false breaks due to crushing the fabric in or near the clamping means. Additionally, and most importantly, our new gripping means is capable of holding even the strongest of textile structures under the tensile forces required to produce the desired breaks or ruptures of the material.

According to our invention we provide a jaw member having a longitudinal wedge seat therein. This seat is formed by at least two intersecting surfaces of the jaw member which will generally be V-shaped in cross-section. The jaw member is fixed to a bracket or other means for transmitting tensile forces to the member and the jaw member is oriented so that the intersecting surfaces of the wedge seat are perpendicular to the direction of the tensile forces to be applied. We also provide a wedge member having a portion of its surface shaped and proportioned to mate with the wedge seat in the jaw member. Means are provided for holding the wedge in mating engagement with the seat.

The end of a fabric specimen to be tested is inserted between the wedge and the seat and then wrapped around that portion of the surface of the wedge member which is opposite the mating portion. Then the other end of the specimen is fixed between the wedge and seat and around the wedge of a similar clamping means. Forces are then applied to the two clamping means which put the specimen in tension. It is seen that wrapping the specimen around the wedge member results in the wedge member being compressed ever tighter into the seat in the jaw member as the tensile forces are increased. We have found that a clamping means of this type has no upper limit to its holding power, since the greater the stress applied, the tighter the specimen is held in the jaws.

To enable those skilled in the art to fully understand our invention we have described in the following specification a particular embodiment thereof. In the specification reference is made to the accompanying drawings of which Fig. 1 is a perspective of a pair of clamps for a tensile testing apparatus;

Fig. 2 is a rear elevation of the clamps of Fig. 1; and

Fig. 3 is a cross-section of the upper clamp of Fig. 2 taken along the line 3—3.

Referring now to Figs. 1 and 2, we have shown generally at 1 and 2 the upper and lower clamping means respectively of a pair of such clamping means to be uesd in tensile testing apparatus. Inasmuch as the upper and lower means are substantially identical only the upper means 1 will be described in detail. Accordingly, the clamping means 1 comprises a bracket having a head 3 and an arm 4 extending downwardly from the head. At the lower end of the arm 4 we provide an elongated jaw member 5 extending perpendicularly to the arm 4. In this embodiment the head, arm, and jaw member form a unitary cast steel structure. It is obvious that whatever the construction, these elements of the device, as well as all others, must be of relatively high strength material and of robust construction to withstand the high stresses applied to them during use.

At 6 there is shown a post for attaching the bracket to the tension apparatus. The post has a stud 7 extending from one end thereof into a hole in the head 3. The post is firmly fixed to the head by means of a shear pin 8 driven into a hole extending through the head 3 and the stud 7. At 9 we have indicated a hole which may be threaded to receive the tractive member of the test apparatus.

The jaw 5 has a V-shaped wedge seat 10 machined into the upper surface thereof and extending longitudinally of the member. Thus, the wedge seat will be perpendicular to the direction of the tensile forces applied to the specimen as will be described in greater detail below. We also provide a wedge member 11 which is shaped and proportioned to mate with the seat 10 in the jaw member. The lower and mating portion of the wedge member is V-shaped in cross-section and the upper portion is half-round in cross-section. All of the longitudinal edges of the wedge member 11 are broken so that they will not cut the fabric as it passes over and around them.

We also provide means for holding the wedge member 11 in mating engagement with the jaw member 5. In this embodiment this means comprises a four-element linkage including a link 12 which is pivotally secured at one end to the bracket arm 4 by a screw 13 and which is also pivotally secured at its opposite end to the upper portion of one end of the wedge member 11 by screw 14. A lever link 15 is pivotally secured at a point intermediate its ends to the bracket arm 4 by a screw 16 and one end of this link is pivotally secured to the lower portion of one end of the wedge member 11 by a screw 17. Thus a four-element linkage is formed of which portions of the bracket arm 4 and of the wedge member 11 constitute opposite elements of the linkage.

To assist in the operation of the clamping means, the end of lever link 15 opposite the end connected to the wedge member may be shaped to afford a suitable handle as at 18. A tension spring 19 is connected between an intermediate point on the lever link 15 and any suitable point on the bracket head 3. The connections of the spring to these members may be made by suitable screws threaded into the members as at 20 and 21.

As best seen in the cross-section of Fig. 3, we also provide a detent comprising a light-duty compression spring 22 and a ball 23 inserted in the hole 24 drilled into the bracket arm 4. The ball 23 engages a depression 25 in the inside surface of the lever link 15.

Both the spring 19 and the detent are primarily for the convenience of the operator and neither contribute in any significant degree to the holding power of the clamping means. Rather, these devices cooperate to hold the wedge 11 in position during insertion of the fabric specimen in the test apparatus and before the tensile forces are applied. The tensile forces, themselves, acting on the fabric specimen develop the holding power of our new capstan jaw.

Although not necessary in all cases it will be found helpful, when the jaws are being used to test exceptionally smooth materials or materials having inordinately high tensile strengths, to knurl the mating surfaces of the wedge seat and of the wedge member. Preferably the knurling is of the conventional straight type with the ridges thereof parallel to the line of intersection of the gripping surfaces on each of the jaw and wedge members.

The operation of our new capstan jaws is extremely simple and no tools are required for the insertion of the fabric specimen. The pair of clamping means 1 and 2 are brought close together. Then with thumb and forefinger the operator may simultaneously open the jaws and wedge members of both gripping means merely by grasping the handles 18 of the linkages between thumb and forefinger and squeezing the handles together. The detent acting on each linkage will hold the clamping means open. Insertion of the fabric specimen, indicated at 26, is accomplished merely by placing the one end of the specimen between the mating surfaces of the jaw and wedge member of the upper gripping means and then wrapping the material around the half-round portion of the wedge member. The specimen is then continued down to the other clamping means 2 where it is first wrapped around the half-round portion of the wedge member thereof and then inserted between the mating surfaces of that clamping means. Both clamping means are then closed by reversing the previous operation of the linkages and the spring 19 will hold the specimen in place.

The testing apparatus may now be caused to apply tensile forces to the specimen by means which are well understood. It will be seen that as the force in the specimen is increased the gripping power of the clamping means will also increase since the specimen tends to pull the wedge members into increasingly tighter engagement with the part of the material between the mating surfaces of the wedge members and the jaw members. This effect will continue until the specimen fails. In view of the fact that the material is nowhere crushed along a sharp edge of the clamping means, failure of a properly prepared specimen will nearly always occur across the straight portion of the specimen between the clamping means 1 and 2. In some of the claims the straight portion of the specimen is used as a reference plane and is referred to as "a predetermined plane." As will be well understood, it is in this section that the tensile stress is at a maximum.

The fabric clamping means of our invention may be employed in any type of fabric tensile strength testing apparatus utilizing heavy clamps to hold the specimen. Examples of such apparatus are the Scott pendulum type, the Suter pendulum type, or the Instron type.

Having described in detail a complete embodiment of our invention for the purposes of illustration only, we do not propose to be limited by the details of the particular embodiment but only by the scope of the following claims.

We claim:

1. Fabric gripping means for use with tensile testing apparatus having means for exerting tractive effort in a predetermined direction parallel to a predetermined plane, which gripping means comprises a rigid jaw member constructed and arranged to be secured to the tractive means of the testing apparatus in a position which is offset from the plane, said jaw member having an elongated wedge seat disposed in a portion of the jaw member on the side thereof which is toward the direction of the tractive effort, said wedge seat having a V-shaped cross section and having the lengthwise dimension of the seat extending substantially parallel to the predetermined plane and transverse to the direction in which tractive effort is applied, a wedge member having a portion of its cross-section shaped and proportioned to mate with said wedge seat and having the opposite portion of the cross-section formed as an unbroken curve, the dimensions of said wedge member being such that the curved portion of the wedge is tangent to the plane when said wedge is engaged in said seat, and means for movably holding said wedge in alignment with said seat, wherein a fabric specimen inserted between said wedge member and said jaw member and wrapped around the curved portion of said wedge member and extended in the predetermined plane increases the holding pressure exerted on the specimen as the tractive effort applied to said specimen through the gripping means is increased.

2. Fabric gripping means according to claim 1 in which the means for maintaining the wedge in alignment comprises a quadrilateral linkage lying in a plane transverse to the lengthwise dimension of said wedge seat, said jaw member and said wedge member constituting opposite members of said linkage, wherein the linkage prevents the wedge member from being pulled out of the wedge seat by tractive effort exerted on the specimen.

3. Fabric gripping means for use with tensile testing apparatus having means for exerting tractive effort in a predetermined direction, which gripping means comprises a rigid jaw member constructed and arranged to be rigidly secured to the tractive means of the testing apparatus, said jaw member having an elongated wedge seat disposed in a portion of the jaw member on the side thereof toward the direction in which tractive effort is applied, the lengthwise dimension of said wedge seat being disposed transversely to the direction in which tractive effort is applied, an elongated wedge member having a first portion of its cross-section shaped and proportioned to mate with said wedge seat and having the portion of its cross-section opposite said first portion formed as a curve which is convex with respect to the first portion, said wedge cross-section having a dimension above the mating portion thereof, such that the wedge, when normally positioned in the wedge seat, extends outwardly from the wedge seat at least as far in a direction transverse to the direction in which tractive effort is applied as does the jaw member in the same direction, and means for maintaining said wedge in mating alignment with said wedge seat, wherein a fabric specimen, having been inserted between the jaw member and the mating portion of the wedge member and then wrapped around the curved portion of the wedge member to extend in the direction opposite to the direction in which tractive effort is applied, does not bear on the jaw member, but does bear on the curved portion of the wedge member to increase the holding pressure exerted on that portion of the specimen between the wedge member and the jaw member as the tractive effort applied to the specimen is increased.

References Cited in the file of this patent

UNITED STATES PATENTS

| | | |
|---|---|---|
| 1,380,800 | Haworth | June 7, 1921 |
| 1,430,783 | Berger | Oct. 3, 1922 |
| 1,591,525 | Gardner et al. | July 6, 1926 |
| 1,872,047 | Templin | Aug. 16, 1932 |
| 2,327,139 | Scott | Aug. 17, 1943 |
| 2,729,869 | Huyser | Jan. 10, 1956 |